(12) United States Patent
Urano (10) Patent No.: US 9,088,192 B2
(45) Date of Patent: Jul. 21, 2015

(54) CONDUCTOR WIRE FOR MOTOR AND COIL FOR MOTOR

(75) Inventor: Hiroaki Urano, Miyoshi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 142 days.

(21) Appl. No.: 13/172,512

(22) Filed: Jun. 29, 2011

(65) Prior Publication Data
US 2012/0092117 A1    Apr. 19, 2012

Related U.S. Application Data (63) Continuation of application No. PCT/JP2010/068186, filed on Oct. 15, 2010.

(51) Int. Cl.
| | | |
|---|---|---|
| H01F 27/30 | (2006.01) | |
| H01F 27/28 | (2006.01) | |
| H01F 27/29 | (2006.01) | |
| H01B 11/06 | (2006.01) | |
| H01B 7/00 | (2006.01) | |
| H02K 3/42 | (2006.01) | |

(52) U.S. Cl.
CPC ........................................ H02K 3/42 (2013.01)

(58) Field of Classification Search
USPC ........ 336/186, 192, 199, 206; 174/36, 113 R, 174/115
See application file for complete search history.

(56) References Cited

U.S. PATENT DOCUMENTS

| | | | | |
|---|---|---|---|---|
| 4,187,391 A | * | 2/1980 | Voser | 174/106 R |
| 2004/0026101 A1 | * | 2/2004 | Ochi | 174/36 |
| 2011/0088926 A1 | * | 4/2011 | Grogl et al. | 174/107 |

FOREIGN PATENT DOCUMENTS

| | | | |
|---|---|---|---|
| JP | 58-057711 A | | 4/1983 |
| JP | 63-127017 U | | 8/1988 |
| JP | 63-143816 U | | 9/1988 |
| JP | 64-001699 U | | 1/1989 |
| JP | 05-066815 U | | 9/1993 |
| JP | 2000-090747 A | | 3/2000 |
| JP | 2007-227264 A | | 9/2007 |
| JP | 2007-227266 A | | 9/2007 |
| JP | 2008-193860 A | | 8/2008 |
| JP | 2008193860 A | * | 8/2008 |
| JP | 2010-055806 A | | 3/2010 |

* cited by examiner

Primary Examiner — Tsz Chan
(74) Attorney, Agent, or Firm — Kenyon & Kenyon LLP (57) ABSTRACT

The present application has a purpose to provide a conductor wire for motor capable of improving durability against bending, and a coil for motor using the conductor wire for motor. One aspect of the invention, therefore, provides a conductor wire for motor comprising a fine wire assembly and a coating member covering an outer peripheral surface of the fine wire assembly, the fine wire assembly consisting of a plurality of fine wires assembled in a bundle, and each of the fine wires including a conductor and an insulating part provided on an outer peripheral surface of the conductor, wherein the coating member is made of metal, and the coating member has an electrical resistance value larger than an electrical resistance value of the conductor.

2 Claims, 7 Drawing Sheets

CONDUCTOR WIRE FOR MOTOR AND COIL FOR MOTOR

CROSS-REFERENCE TO RELATED APPLICATIONS

This application is a continuation application based upon and claims the benefit of the prior PCT International Patent Application No. PCT/JP2010/068186 filed on Oct. 15, 2010, the entire contents of which are incorporated herein by reference.

TECHNICAL FIELD

The present invention relates to a conductor wire for motor including a plurality of electrically conductive fine or thin wires assembled in a bundle and a coil for motor including the conductor wire for motor.

BACKGROUND ART

A flat conductor wire is used as a wire forming a coil in order to enhance the space factor of the coil in a motor. The space factor in this description indicates a ratio of the cross-sectional area of a wire to the cross section of a space in which the coil is placed. However, the flat conductor wire has a large cross-sectional area. Thus, when the flat conductor wire is placed in an alternating magnetic field, large eddy currents tend to occur in a surface perpendicular to magnetic fluxes in the flat conductor wire. This may increase eddy current loss. This eddy current loss is power loss caused by the flow of eddy currents.

Therefore, it is conceivable that a plurality of thin conductor wires (hereinafter, referred to as "fine wires") having an insulating part such as enamel, oxide, etc. formed on an outer peripheral surface is bound in a bundle to reduce the cross-sectional area of each conductor wire, thereby reducing eddy currents to decrease the eddy current loss.

As a conventional technique of binding a plurality of the fine wires in a bundle, a conductor wire is proposed in which the fine wires are assembled in a bundle and a resin coating is formed on the outer peripheral surface of this bundle of fine wires by extrusion to maintain the assembled condition of the fine wires.

However, the outer peripheral surface of the bundle of fine wires is coated with resin and thus a coating part is low in strength. For example, when a conductor wire is bent to form a coil for motor and the bending radius of each bend (each curved portion) of the conductor wire becomes different between the inside fine wire and the outside fine wire, causing a difference in circumferential length, the fine wires could not maintained in the assembly state by the resin coating. The fine wires tied in a bundle will come apart.

Herein, Patent Literature 1 discloses a compound winding in which a plurality of flat insulating wires are stacked and provided with a common insulating layer on an outer peripheral surface of the assembly.

CITATION LIST

Patent Literature

Patent Literature 1: JP-U-05-66815 (1993)

SUMMARY OF INVENTION

Technical Problem

In the compound winding in Patent Literature 1, however, the common insulating layer is made of insulating materials such as insulating paper and plastic tape and therefore is low in strength. When the compound winding is bent, consequently, the common insulating layer may be broken, thus causing the flat insulating wires to come apart. The compound winding in Patent Literature 1 is therefore low in durability against a bending process.

The present invention has a purpose to provide a conductor wire for motor with enhanced durability against a bending process and a coil for motor made of the conductor wire for motor.

Solution to Problem

To achieve the above purpose, one aspect of the invention provides a conductor wire for motor comprising a fine wire assembly and a coating member covering an outer peripheral surface of the fine wire assembly, the fine wire assembly consisting of a plurality of fine wires assembled in a bundle, and each of the fine wires including a conductor and an insulating part provided on an outer peripheral surface of the conductor, wherein the coating member is made of metal, the coating member has an electrical resistance value equal to or larger than an electrical resistance value of the conductor, and the coating member is a foil-shaped member.

Specifically, the electrical resistance value of the coating member is equal to or larger than the electrical resistance value of the conductor.

According to this configuration, the coating member is made of metal and therefore the coating member can have higher strength than in a conventional art using a coating member made of resin. Therefore, even when the conductor wire for motor of the invention is bent to form a coil for motor and the bending radius becomes different between the fine wire located on an inner diameter side and the fine wire located on an outer diameter side, causing a difference in circumferential length, the fine wire assembly can be kept in an assembly state by the coating member without coming apart. Consequently, the conductor wire for motor can provide high durability against bending.

In the case where the coating member is made of the metal having a larger electrical resistance value than the electrical resistance value of the conductors of the fine wires, it is possible to prevent an eddy current from occurring in the coating member when an alternating magnetic field is applied to a motor including the coil for motor made of the conductor wire for motor of the present invention. Therefore, the motor including the coil for motor formed of the conductor wire for motor of the invention can further reduce eddy current loss. Further, the plurality of fine wires can be easily assembled in a bundle by the foil-shaped member. This can reduce the workload of manufacturing the conductor wire for motor.

In the above configuration, preferably, the conductor wire for motor has a rectangular cross section, and the foil-shaped member has a joint in which edges of the foil-shaped member are joined to each other, the joint being placed on a surface defining a short side of the cross section.

According to the above configuration, when the conductor wire for motor of the present invention is bent to form the coil for motor, the joint (or seam) of the foil-shaped member is placed on the outer peripheral side of the coil for motor. Thus, no large load will be applied to the joint of the foil-shaped member. This can prevent the joint of the foil-shaped member from coming apart or separating. Therefore, the coil for motor can be manufactured while maintaining the fine wires of the fine wire assembly in the assembled state.

To achieve the above purpose, another aspect of the invention provides a coil for motor formed of a spirally wound conductor wire for motor, comprising a fine wire assembly and a coating member covering an outer peripheral surface of the fine wire assembly, the fine wire assembly consisting of a plurality of fine wires assembled in a bundle, and each of the fine wires including a conductor and an insulating part provided on an outer peripheral surface of the conductor, wherein the coating member is a foil-shaped member made of a metal having an electrical resistance value equal to or larger than an electrical resistance value of the conductor, and the foil-shaped member has a joint in which edges of the foil-shaped member are joined to each other, the joint being placed on an outer peripheral side of the coil for motor.

According to the above configuration, the coating member is made of metal and therefore the coating member can have higher strength than in a conventional art using a coating member made of resin. Therefore, even when the conductor wire for motor of the invention is bent to form a coil for motor and the bending radius becomes different between the fine wire located on an inner diameter side and the fine wire located on an outer diameter side, causing a difference in circumferential length, the fine wire assembly can be kept in an assembly state by the coating member without coming apart.

In the case where the coating member is made of the metal having a larger electrical resistance value than the electrical resistance value of the conductor of the fine wire, it is possible to prevent an eddy current from an eddy current from occurring in the coating member when an alternating magnetic field is applied to the motor including the coil for motor formed of the conductor wire for motor of the present invention. Therefore, the motor including the coil for motor formed of the conductor wire for motor of the invention can further reduce eddy current loss.

Further, the joint of the foil-shaped member in each bend (each curved portion) of the coil for motor is located on the outer peripheral side of the coil for motor. Accordingly, during edgewise bending of the conductor wire for motor to form the coil for motor, a difference in a wire deforming state of the conductor wire between both sides of the joint in each bent of the coil for motor is small. Thus, no large load will be applied to the joint of the foil-shaped member. This can prevent the joint of the foil-shaped member from coming apart or separating. Consequently, the fine wires of the fine wire assembly can be maintained in the assembled state.

Advantageous Effects of Invention

A conductor wire for motor and a coil for motor according to the present invention can provide improved durability against a bending process.

DESCRIPTION OF EMBODIMENTS

A detailed description of a preferred embodiment of the present invention will now be given referring to the accompanying drawings. The following explanation is given by exemplifying a flat conductor wire having a rectangular cross-section as a conductor wire for motor. However, the present invention is not limited to the following and may be applied variously to a conductor wire having a different polygonal cross-section, a conductor wire having a circular cross-section, and others.

First Embodiment

Figure 1:
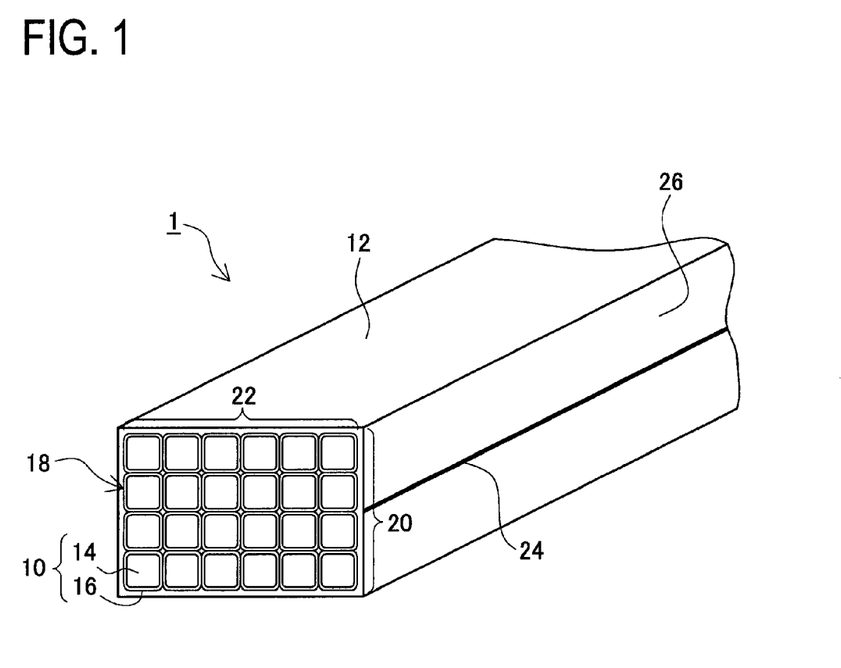
FIG. 1 is an external perspective view of a flat conductor wire in a first embodiment.

A flat conductor wire 1 in the first embodiment includes a plurality of fine wires 10 and a foil 12 as shown in FIG. 1. The foil 12 is an example of a "foil-shaped member". For convenience of explanation, in FIG. 1, the flat conductor wire 1 is illustrated by omitting an insulating layer made of enamel resin or the like on an outer peripheral surface of the conductor wire 1 to ensure an insulating property.

Each fine wire 10 is formed of a core wire 14 provided with an insulating part 16 on an outer peripheral surface. The core wire 14 is a conductor made of conductive metal such as copper, aluminum (aluminium), silver, gold, or their alloys and shaped in a linear form. The insulating part 16 is made of enamel resin, metal oxide, or the like.

As shown in FIG. 1, the flat conductor wire 1 is formed of a fine wire assembly 18 including a plurality of fine wires 10 assembled in a bundle, and the foil 12 covering the outer peripheral surface of the fine wire assembly 18. In this embodiment, the flat conductor wire 1 is designed with a rectangular cross section having short sides 20 and long sides 22. A joint or seam 24 formed by joining both edges of the foil 12 (in a circumferential direction of the cross section of the flat conductor wire 1) is located on a surface 26 defining one of the short sides 20 of the cross section of the flat conductor wire 1. Specifically, this surface 26 will be positioned on the outer peripheral side of a coil 28 (see FIG. 3) when the flat conductor wire 1 is edgewise bent to form the coil 28. It should be noted that the flat conductor wire 1 includes the fine wires 10 arranged six in a horizontal direction and four in a vertical direction in FIG. 1.

The material of the foil 12 is the same metal as that of the core wires 14 of the fine wires 10 (i.e., a metal having the same electrical resistance value) or a metal having an electrical resistance value larger than an electrical resistance value of the core wires 14 of the fine wires 10. For example, in the case where the material of the core wires 14 of the fine wires 10 is copper, the foil 12 is made of copper or a metal (e.g., aluminum or iron) having a larger electrical resistance value than copper. In the case where the material of the core wires 14 of the fine wires 10 is aluminum, the foil 12 is made of aluminum or a metal (e.g., iron) having a larger electrical resistance value than aluminum.

Especially, in the case where the material of the foil 12 is the metal having a larger electrical resistance value than the electrical resistance value of the core wires 14 of the fine wires 10, when the coil 28 (see FIG. 3) formed of the flat conductor wire 1 is mounted in a motor (not shown) and the flat conductor wire 1 is placed in an alternating magnetic field, an eddy current to be generated in the foil 12 decreases. Thus, eddy current loss is reduced.

A method of manufacturing the flat conductor wire 1 configured as above will be explained below.

Firstly, a plurality of the fine wires 10 are assembled in a bundle to form the fine wire assembly 18. In this embodiment, as one example, twenty-four fine wires 10 are assembled in a bundle.

Figure 2:
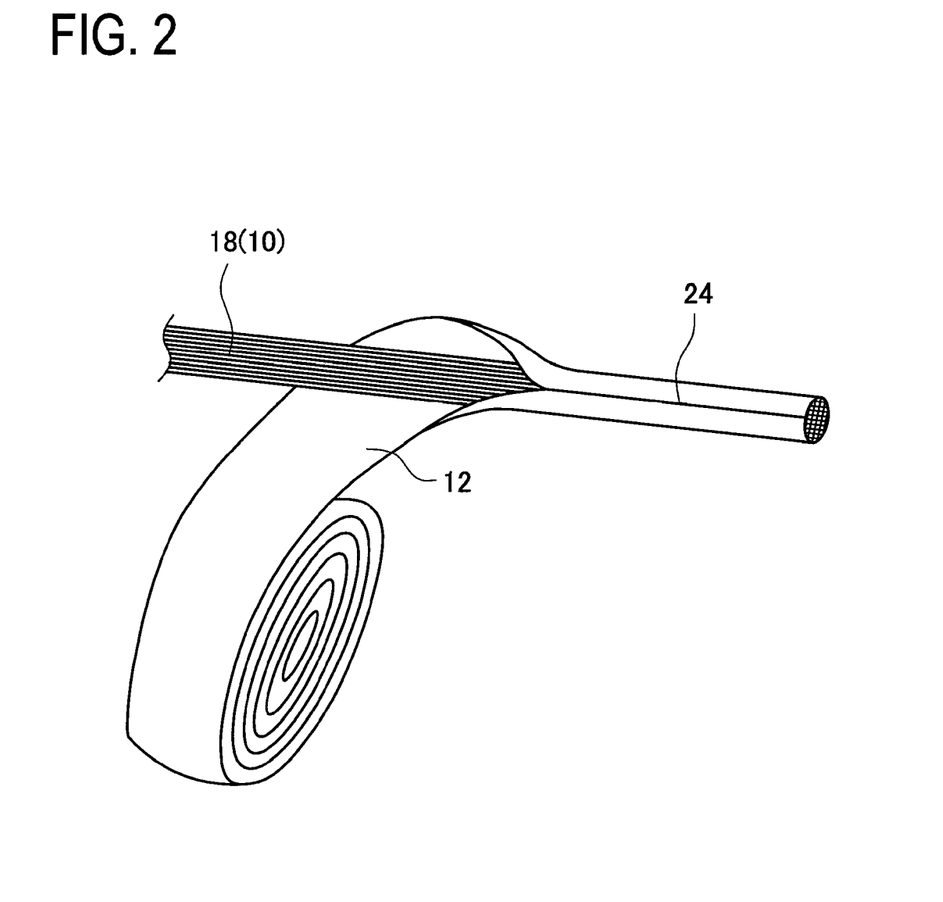
FIG. 2 is a view showing a process of wrapping a fine wire assembly with a foil.

As shown in FIG. 2, the foil 12 is wound around the outer peripheral surface of the fine wire assembly 18 and then the edges of the foil 12 are joined. Thus, the outer peripheral surface of the fine wire assembly 18 is coated and wrapped with the foil 12. A method of joining the edges of the foil 12 may include laser welding, applying and baking an adhesive, pressure welding, or other techniques.

Subsequently, a resultant wire obtained by wrapping the fine wire assembly 18 with the foil 12 is subjected to rolling. The thus rolled wire is then pulled through a die (not shown) with a predetermined size. Consequently, the flat conductor wire 1 shaped in a rectangular form having a desired cross sectional area is manufactured. For instance, the flat conductor wire 1 is formed so that the fine wires 10 are arranged six in the horizontal direction and four in the vertical direction in FIG. 1.

Thereafter, to ensure the insulating property of the flat conductor wire 1, the outer peripheral surface of the flat conductor wire 1 is coated with enamel resin and subjected to baking. This flat conductor wire 1 is wound up on a bobbin.

As above, the flat conductor wire 1 in the first embodiment is manufactured.

Figure 3:
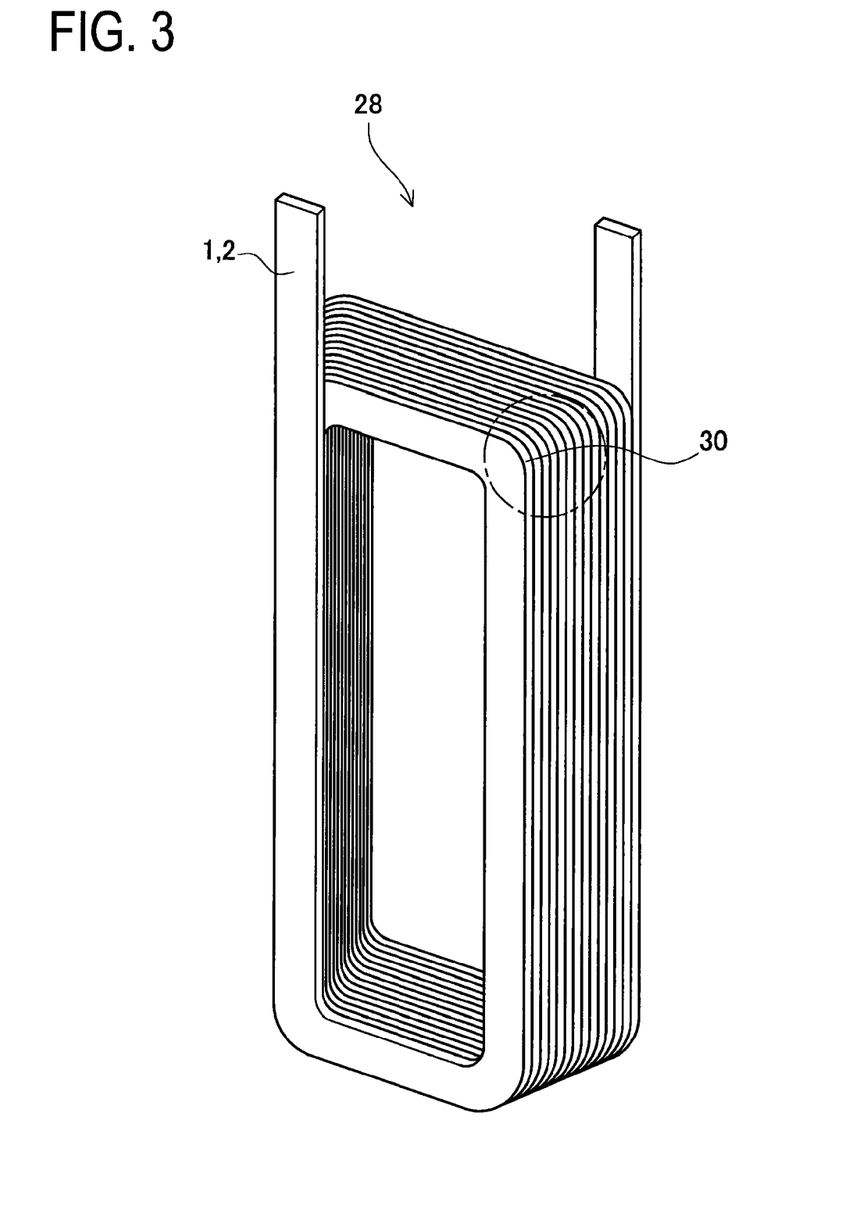
FIG. 3 is an external perspective view of a coil for motor.
Figure 4:
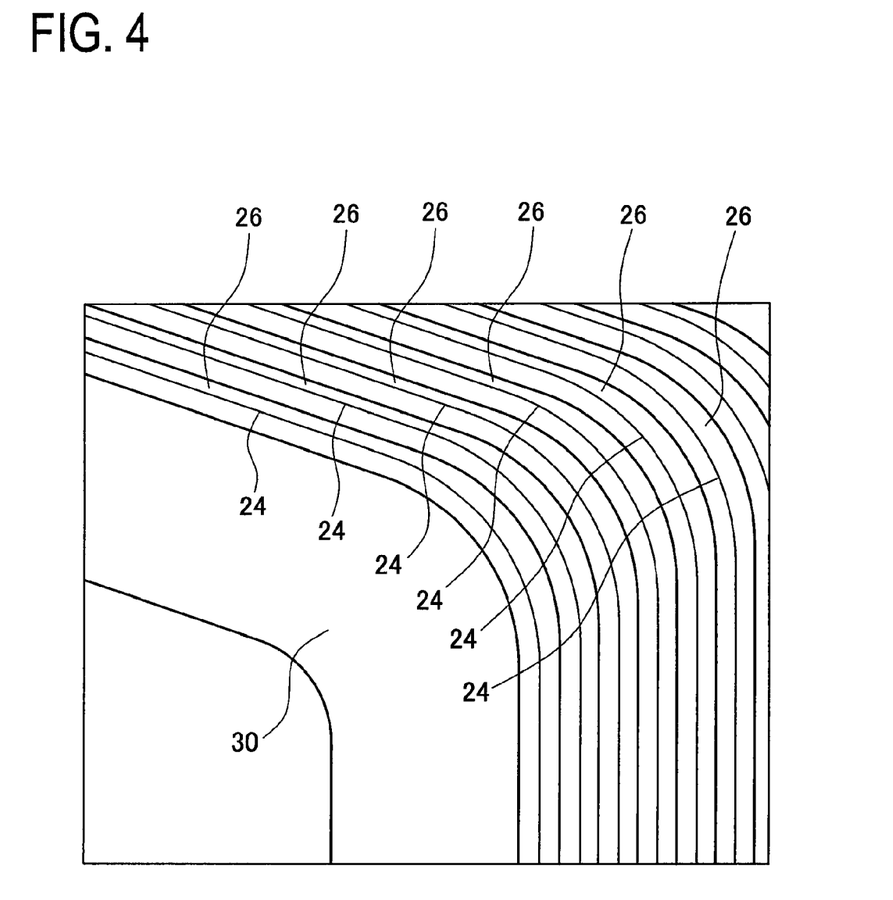
FIG. 4 is an enlarged view of a bent of the coil for motor.

FIG. 3 shows an example of forming the coil 28 from the flat conductor wire 1 manufactured as above. FIG. 4 is an enlarged view of a bend (a curved portion) 30 of the coil 28 and its surroundings (a part circled with a long and short dashed line in FIG. 3). The coil 28 is an example of the "coil for motor" of the present invention.

As shown in FIG. 3, the coil 28 is made by spirally winding the flat conductor wire 1 in an edgewise bending manner. Herein, the edgewise bending is a winding method in which the flat conductor wire 1 is wound edgewise so that one of the short side surfaces forms an inner diameter surface and the other forms an outer diameter surface, i.e., the flat conductor wire 1 is bent in a widthwise direction.

In the present embodiment, the joint 24 of the foil 12 is located on the surface 26 as shown in FIG. 1. Thus, the flat conductor wire 1 is spirally wound so that this surface 26 forms the outer diameter surface. In this way, the coil 28 is produced in which the joint 24 of the foil 12 is located on the outer peripheral side of the coil 28. Accordingly, at the bend 30 of the coil 28, the joint 24 of the foil 12 is positioned on the outer peripheral side of the coil 28 as shown in FIG. 4.

When the flat conductor wire 1 is to be wound on the bobbin as mentioned above, the flat conductor wire 1 is preferably wound with the joint 24 of the foil 12 facing outwardly. Accordingly, in forming the coil 28, it is easy to bring the joint 24 of the foil 12 on the outer peripheral side of the coil 28.

According to the flat conductor wire 1 in the first embodiment, the fine wires 10 each having a small cross-sectional area are adopted as a conductor wire which is electrically conductive. Accordingly, when an alternating magnetic field is applied to a motor including the coil 28 formed of the flat conductor wire 1, the flat conductor wire 1 can restrain the occurrence of an eddy current therein. Therefore, the motor including the coil 28 formed of the flat conductor wire 1 in the first embodiment can attain a reduction in eddy current loss.

Further, the outer peripheral surface of the fine wire assembly 18 consisting of the plurality of fine wires 10 assembled in a bundle is coated and wrapped with the metal foil 12. Thus, the coating part can provide higher strength than the resin coating in a conventional method. Even when a difference in circumference length occurs due to a difference in bending radius between the fine wire 10 located on the inner diameter side and the fine wire 10 on the outer diameter side of the flat conductor wire 1 bent to form the coil 28, the fine wire assembly 18 is kept in an assembly state by the foil 12 without coming apart. Consequently, the durability of the flat conductor wire 1 against the bending can be enhanced.

Since the foil 12 is made of the metal having a larger electrical resistance value than the electrical resistance value of the core wires 14 of the fine wires 10, an eddy current can be prevented from occurring in the foil 12 when an alternating magnetic field is applied to a motor including the coil 28 formed of the flat conductor wire 1. Therefore, in the motor including the coil 28 formed of the flat conductor wire 1 in the first embodiment, the eddy current loss can be further reduced.

Since the plurality of fine wires 10 are assembled in a bundle and wrapped with the foil 12, the workload of manufacturing the flat conductor wire 1 can be reduced.

The coil 28 is formed of the flat conductor wire 1 spirally wound so that the joint 24 of the foil 12 is positioned on the outer peripheral side of the coil 28. Accordingly, even in the bend 30 of the coil 28, the joint 24 of the foil 12 is located on the outer peripheral side of the coil 28. Thereby, during edgewise bending of the flat conductor wire 1 forming the coil 28, a difference in wire deforming state of the conductor wire between both sides of the joint in the bend 30 (e.g., a coefficient of extension in the inner peripheral side and the outer peripheral side of the coil 28) is small. Thus, a large load is not exerted on the joint 24. This can prevent the joint 24 from separating. Consequently, the assembly state of the fine wires 10 in the fine wire assembly 18 can be maintained.

Second Embodiment

Figure 5:
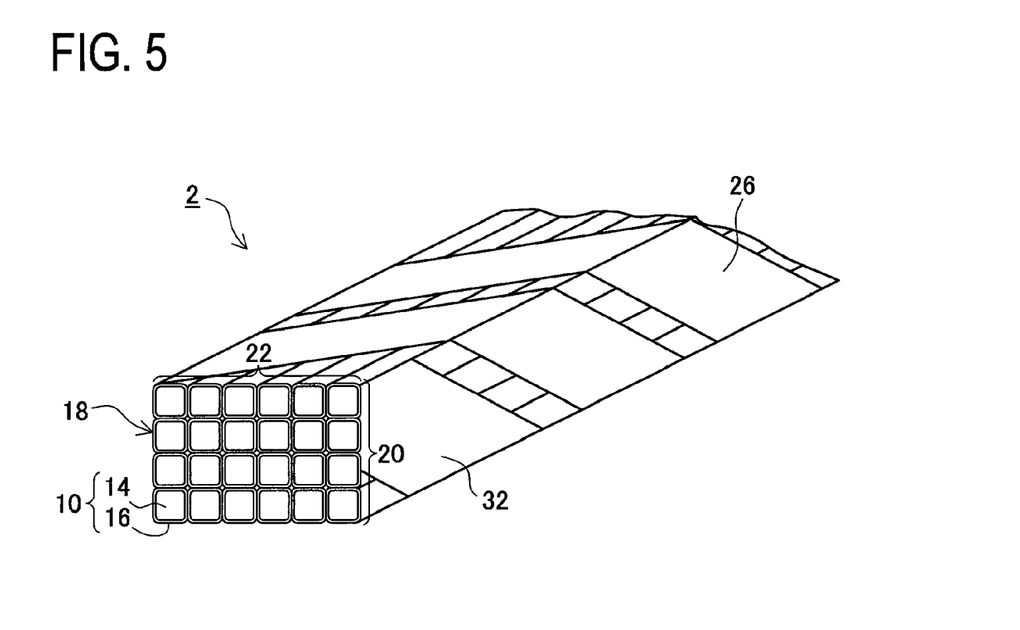
FIG. 5 is an external perspective view of a flat conductor wire in a second embodiment.

A flat conductor wire 2 in a second embodiment includes a plurality of fine wires 10, a tape 32, and others as shown in FIG. 5. The fine wires 10 are identical to those in the first embodiment. The flat conductor wire 2 is formed by spirally winding the tape 32 on the outer peripheral of a fine wire assembly 18 consisting of the fine wires 10 assembled in a bundle as shown in FIG. 5. The tape 32 is an example of a "strip member" of the invention. In the following explanation, similar or identical parts to those in the first embodiment are given the same reference signs and their details are not explained.

The tape 32 is made of the same metal as a core wire 14 of each fine wire 10 (i.e., a metal having the same electrical resistance value) or a metal having an electrical resistance value larger than the electrical resistance value of the core wires 14 of the fine wires 10. For instance, in the case where the material of the core wires 14 of the fine wires 10 is copper, the tape 32 is made of copper or a metal (e.g., aluminum and iron) having an electrical resistance value larger than copper. Further, in the case where the material of the core wires 14 of the fine wires 10 is aluminum, the tape 32 is made of aluminum or a metal (e.g., iron) having an electrical resistance value larger than aluminum.

In the case where the material of the tape 32 is the metal having a larger electrical resistance value than the electrical resistance value of the core wire 14 of the fine wire 10, when a coil 28 formed of the flat conductor wire 2 is mounted in a motor and the flat conductor wire 2 is placed in an alternating magnetic field, an eddy current to be generated in the tape 32 decreases. Thus, eddy current loss is reduced.

A winding method of the tape 32 is as below. The tape 32 is wound so that adjacent portions of the tape 32 around the fine wire assembly 18 are placed at spaced intervals in the axial direction of the fine wire assembly 18 between turns as shown in FIG. 5. Alternatively, the tape 32 may be wound so that an edge 34 of the tape 32 in the short side direction overlaps an edge 34 of the tape 32 wound in previous turn on the fine wire assembly 18 as shown in FIG. 6.

A method of manufacturing the flat conductor wire 2 configured as above will be explained. Firstly, in a similar way to the first embodiment, the plurality of fine wires 10 are assembled to form the fine wire assembly 18.

Figure 7:
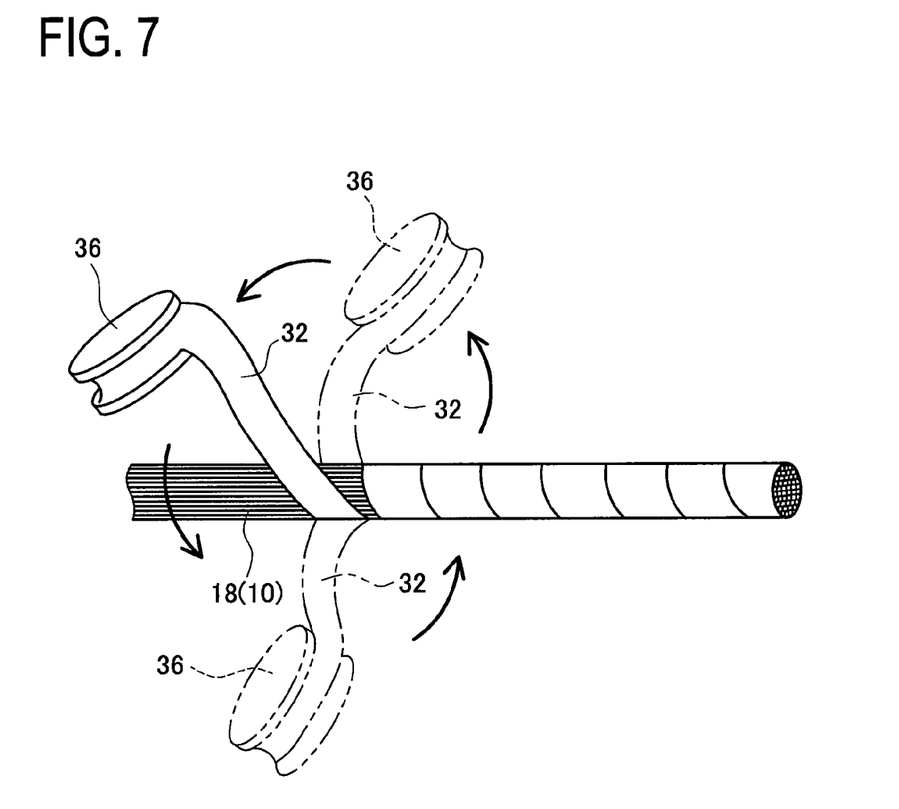
FIG. 7 is a view showing a process of winding tape on a fine wire assembly.
Figure 8:
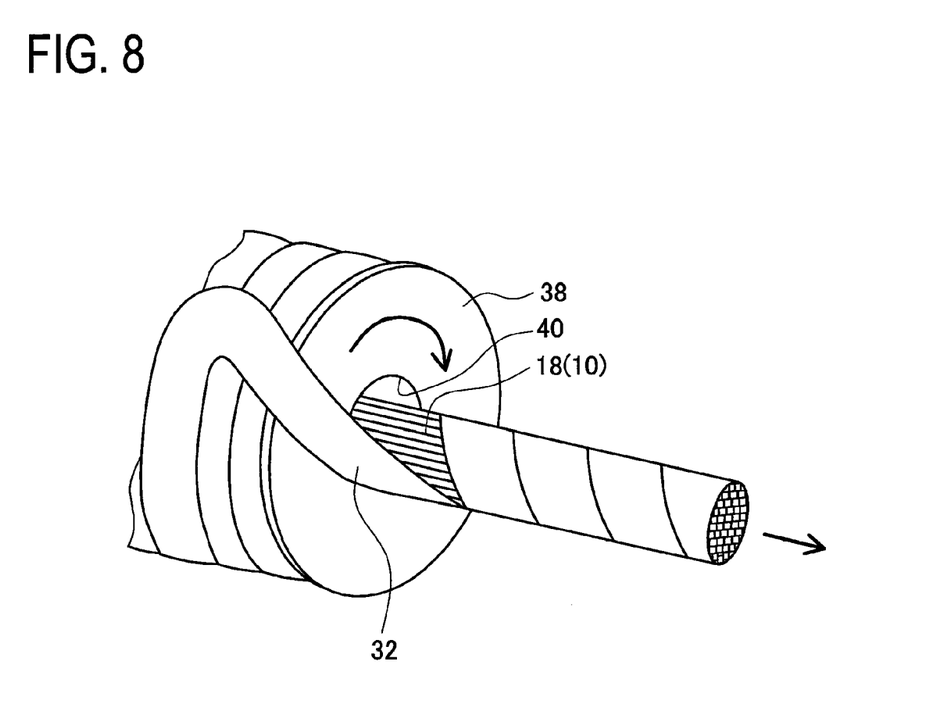
FIG. 8 is a view showing another process of winding tape on a fine wire assembly.

Secondly, the tape 32 supplied from a bobbin 36 or 38 is wound on the outer peripheral surface of the fine wire assembly 18. At that time, a winding method of the tape 32 is conceived as below. As shown in FIG. 7, while the fine wire assembly 18 is at rest, the bobbin 36 is rotated circumferentially around the fine wire assembly 18 and moved in the axial direction thereof, thereby winding the tape 32 on the outer peripheral surface of the fine wire assembly 18. As shown in FIG. 8, alternatively, while the fine wire assembly 18 is placed through a hole 40 formed in the center of the bobbin 38, the bobbin 38 is rotated, thereby winding the tape 32 on the outer peripheral surface of the fine wire assembly 18.

Figure 6:
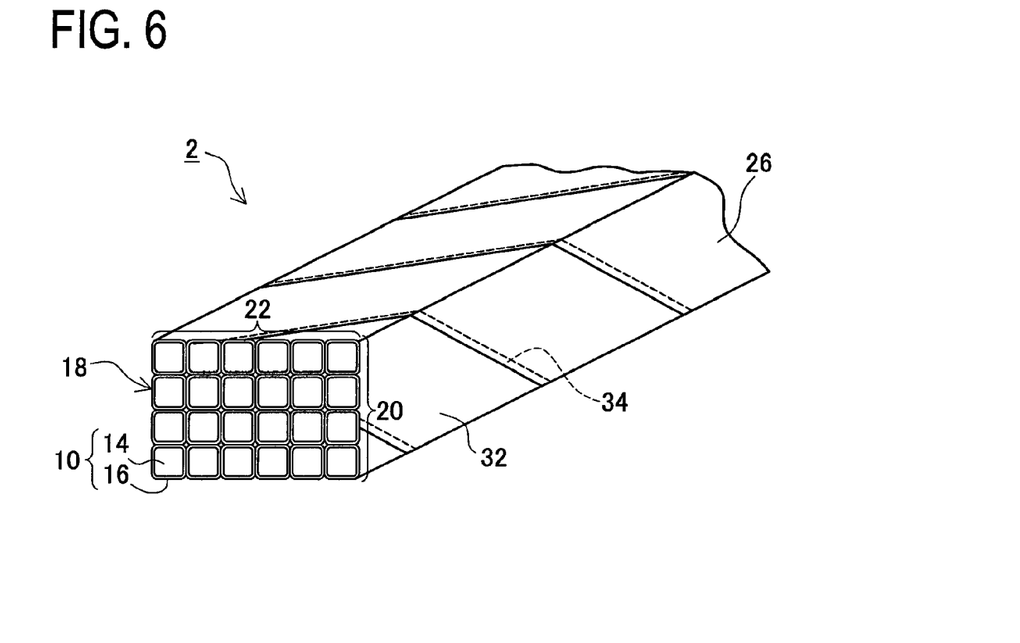
FIG. 6 is an external perspective view of a modified example of the flat conductor wire in the second embodiment.

In the case of winding the tape 32 with the edges 34 in the short side direction overlapping in the axial direction of the fine wire assembly 18 as shown in FIG. 6, the edges 34 of the tape 32 in the short side direction may be joined or adhered with each other. This joining or adhering method may include e.g. laser welding, applying and baking an adhesive, pressure welding, or other techniques.

Subsequently, a resultant wire obtained by winding the tape 32 on the fine wire assembly 18 is subjected to rolling. The thus rolled wire is then pulled through a die (not shown) with a predetermined size. Consequently, the flat conductor wire 2 shaped in a rectangular form having a desired cross sectional area is manufactured.

Thereafter, to ensure the insulating property of the flat conductor wire 2, the outer peripheral surface of the flat conductor wire 2 is coated with enamel resin and subjected to baking. This flat conductor wire 2 is wound up on a bobbin.

As above, the flat conductor wire 2 in the second embodiment is manufactured. The thus manufactured flat conductor wire 2 is edgewise bent to form the coil 28 as shown in FIG. 4.

According to the flat conductor wire 2 in the second embodiment, the fine wires 10 each having a small cross-sectional area are adopted as a conductor wire which is electrically conductive. Accordingly, when an alternating magnetic field is applied to a motor including the coil 28 formed of the flat conductor wire 2, the flat conductor wire 2 can prevent the occurrence of an eddy current therein. Therefore, the motor including the coil 28 formed of the flat conductor wire 2 in the second embodiment can attain a reduction in eddy current loss.

Further, the outer peripheral surface of the fine wire assembly 18 consisting of the plurality of fine wires 10 assembled in a bundle is coated and wrapped with the tape 32. Thus, the coating can provide higher strength than the resin coating in a conventional method. Even when a difference in circumference length occurs due to a difference in bending radius between the fine wire 10 located on the inner diameter side and the fine wire 10 located on the outer diameter side of the flat conductor wire 2 bent to form the coil 28, the fine wire assembly 18 is kept in an assembly state by the tape 32 without coming apart. Consequently, the durability of the flat conductor wire 2 against the bending can be enhanced.

Since the tape 32 is made of the metal having a larger electrical resistance value than the electrical resistance value of the core wires 14 of the fine wires 10, an eddy current can be prevented from occurring in the tape 32 when an alternating magnetic field is applied to a motor including the coil 28 formed of the flat conductor wire 2. Therefore, in the motor including the coil 28 formed of the flat conductor wire 2, the eddy current loss can be further reduced.

Since the plurality of fine wires 10 are assembled in a bundle and wrapped with the tape 32, the workload of manufacturing the flat conductor wire 2 can be reduced.

Further, the tape 32 is wound on the fine wire assembly 18 by placing adjacent portions of the tape 32 at spaced intervals between turns, so that the amount of use of the tape 32 can be reduced, leading to manufacturing cost reduction. Further, the flat conductor wire 2 is easy to bend, thus reducing the workload of forming the coil 28.

The tape 32 is wound on the fine wire assembly 18 by having the edges 34 in the short side direction overlapped one on the other in the axial direction of the fine wire assembly 18 in each turn thereon. The tape 32 can provide higher strength to hold the fine wires 10. Therefore, the fine wires 10 can be more stably maintained in the assembled state. The tape 32 also can provide electrical conductivity.

The tape 32 can be easily wound and does not need the joining work such as welding in the first embodiment. The flat conductor wire 2 in the second embodiment can further reduce the manufacturing cost than the flat conductor wire 1 in the first embodiment.

The above embodiments are mere examples and do not give any limitations to the present invention. The present invention may be embodied in other specific forms without departing from the essential characteristics thereof. For instance, the fine wires 10 in the first and second embodiments each have a rectangular cross section but alternatively may have another polygonal shape such as square, triangular, and hexagonal shapes or a circular shape. The fine wires 10 may be designed so that their cross sections are the same as or different from each other.

REFERENCE SIGNS LIST

1 Flat conductor wire
2 Flat conductor wire
10 Fine wire
12 Foil
14 Core wire
16 Insulating part
18 Fine wire assembly
20 Short side
22 Long side
24 Joint
26 Plane
28 Coil
30 Bend
32 Tape
34 Edge
36 Bobbin
38 Bobbin
40 Hole

The invention claimed is:

1. A conductor wire for motor comprising a fine wire assembly and a coating member covering an outer peripheral surface of the fine wire assembly, the fine wire assembly consisting of a plurality of fine wires assembled in a bundle, and each of the fine wires including a conductor and an insulating part provided on an outer peripheral surface of the conductor, wherein the coating member is made of metal, the coating member has an electrical resistance value larger than an electrical resistance value of the conductor, the coating member is a foil-shaped member, the conductor wire for motor has a rectangular cross section, and the foil-shaped member has a joint in which edges of the foil-shaped member are joined to each other, the joint being placed on a surface defining a short side of the cross section.

2. A coil for motor formed of a spirally wound conductor wire for motor, comprising a fine wire assembly and a coating member covering an outer peripheral surface of the fine wire assembly, the fine wire assembly consisting of a plurality of fine wires assembled in a bundle, and each of the fine wires including a conductor and an insulating part provided on an outer peripheral surface of the conductor, wherein the coating member is a foil-shaped member made of a metal having an electrical resistance value larger than an electrical resistance value of the conductor, and the foil-shaped member has a joint in which edges of the foil-shaped member are joined to each other, the joint being placed on an outer peripheral side of the coil for motor which is formed by winding the conductor wire.

* * * * *